(No Model.)

F. D. CORDES.
FIRE KINDLER.

No. 308,878. Patented Dec. 9, 1884.

WITNESSES:
Robert H. Roy
Hermann Koster

INVENTOR
Frederick D. Cordes
BY
Frank Friesen
ATTORNEY

N. PETERS, Photo-Lithographer, Washington, D. C.

UNITED STATES PATENT OFFICE.

FREDERICK D. CORDES, OF NEW YORK, N. Y.

FIRE-KINDLER.

SPECIFICATION forming part of Letters Patent No. 308,878, dated December 9, 1884.

Application filed January 17, 1884. (No model.)

*To all whom it may concern:*

Be it known that I, FREDERICK D. CORDES, of the city of New York, in the county and State of New York, have invented a new and Improved Fire-Kindler, of which the following specification is a full, clear, and exact description.

This invention relates to a new fire-kindler; and it consists in making the same of a piece of corn or other stalk having a split end and covered with a combustible material; also in removing the pith from said stalk, all as hereinafter more fully described.

Figure 1:
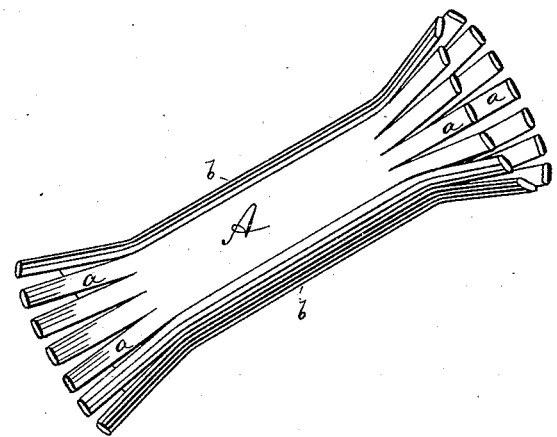
Figure 2:
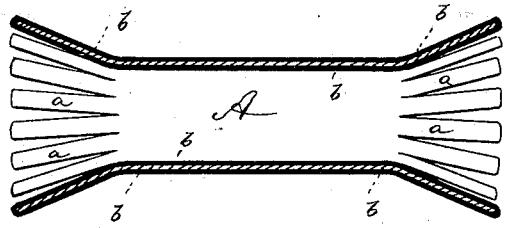

In the accompanying drawings, Figure 1 is a perspective view of my improved fire-kindler. Fig. 2 is a longitudinal central section through the same.

The letter A represents the body of my improved fire-kindler, the same consisting of a section of cornstalk. From this the pith may be removed, so that an open tube is obtained, as shown; but, if desired, the pith may be retained. At one or both ends $a$, I split the stalk A by a series of cuts about an inch long, and then I bend the split end or ends outward, as shown. The stalk is finally immersed in molten resin or other combustible material, $b$, which will coat the stalk at the outside, and, if hollow, also on the inside.

The fire-kindler thus made will catch the fire and burn very rapidly, and can be cheaply produced.

I am aware that fire-kindlers have been made of a stick of wood having its end crushed and dried; of shavings wound into the form of tubes and made into a bundle with wood sticks and the whole dipped into rosin; a bundle of excelsior retained in shape by its own fibers and dipped in rosin, and of dried stalks of grass or straw made into a bundle. My kindler differs from all these, and I do not make any claim to any of them; but

I claim as my invention—

A fire-kindler composed of the stalk A, having split and outwardly-bent end $a$, and covered with a combustible material, $b$, substantially as specified.

FREDERICK D. CORDES.

Witnesses:
F. V. BRIESEN,
ROBT. H. ROY.